US010776233B2

(12) United States Patent
Frick et al.

(10) Patent No.: US 10,776,233 B2
(45) Date of Patent: Sep. 15, 2020

(54) PROGRAMMABLE TEST INSTRUMENT

(75) Inventors: Lloyd K. Frick, Pepperell, MA (US); David John Lind, North Andover, MA (US)

(73) Assignee: Teradyne, Inc., North Reading, MA (US)

( * ) Notice: Subject to any disclaimer, the term of this patent is extended or adjusted under 35 U.S.C. 154(b) by 25 days.

(21) Appl. No.: 13/284,491

(22) Filed: Oct. 28, 2011

(65) Prior Publication Data
US 2013/0111505 A1 May 2, 2013

(51) Int. Cl.
*G06F 11/263* (2006.01)
(52) U.S. Cl.
CPC .................. *G06F 11/263* (2013.01)
(58) Field of Classification Search
CPC ...................................................... G06F 11/263
See application file for complete search history.

(56) References Cited

U.S. PATENT DOCUMENTS

| 604,448 A | 5/1898 | Wells |
| 588,385 A | 8/1898 | Black |
| 3,789,360 A | 1/1974 | Clark, Jr. et al. |
| 3,800,090 A | 3/1974 | Matena |
| 3,810,120 A | 5/1974 | Huettner et al. |
| 3,833,888 A | 9/1974 | Stafford et al. |
| 3,864,670 A | 2/1975 | Inoue et al. |
| 3,873,818 A | 3/1975 | Barnard |
| 4,038,533 A | 7/1977 | Dummermuth et al. |
| 4,042,972 A | 8/1977 | Gruner et al. |
| 4,195,351 A | 3/1980 | Barner et al. |
| 4,357,703 A | 11/1982 | Van Brunt |
| 4,466,055 A | 8/1984 | Kinoshita et al. |
| 4,481,625 A | 11/1984 | Roberts et al. |
| 4,496,985 A | 1/1985 | Jensen et al. |
| 4,509,008 A | 4/1985 | DasGupta et al. |

(Continued)

FOREIGN PATENT DOCUMENTS

| EP | 1544632 B1 | 8/2008 |
| EP | 2387723 B1 | 9/2014 |

(Continued)

OTHER PUBLICATIONS

Authorized officer Sung Cheal Byun, International Search Report and Written Opinion dated Jan. 30, 2013 in international application No. PCT/US2012/056250, 9 pgs.

(Continued)

*Primary Examiner* — Doon Y Chow
*Assistant Examiner* — Carina Yun
(74) *Attorney, Agent, or Firm* — Burns & Levinson LLP

(57) ABSTRACT

In general, a test instrument includes a first processing system that is programmable to run one or more test programs to test a device interfaced to a test instrument, and that is programmed to control operation of the test instrument, and a second processing system that is dedicated to device testing. The second processing system being programmable to run one or more test programs to test the device, and the first processing system has a first application programming interface (API) and the second processing system has a second API, the first API and the second API being different APIs, the first API and the second API having at least some duplicate functions.

20 Claims, 4 Drawing Sheets

(56) References Cited

U.S. PATENT DOCUMENTS

| | | | |
|---|---|---|---|
| 4,511,968 A | 4/1985 | Fencsik et al. |
| 4,525,802 A | 6/1985 | Hackamack |
| RE32,326 E | 1/1987 | Nagel et al. |
| 4,658,209 A | 4/1987 | Page |
| 4,775,976 A | 10/1988 | Yokoyama |
| 4,807,147 A | 2/1989 | Halbert et al. |
| 4,823,363 A | 4/1989 | Yoshida |
| 4,890,102 A | 12/1989 | Oliver |
| 4,901,259 A | 2/1990 | Watkins |
| 4,961,053 A | 10/1990 | Krug |
| 5,049,814 A | 9/1991 | Walker, III et al. |
| 5,061,033 A | 10/1991 | Richard |
| 5,072,175 A | 12/1991 | Marek |
| 5,091,692 A | 2/1992 | Ohno et al. |
| 5,177,630 A | 1/1993 | Goutzoulis et al. |
| 5,218,684 A | 6/1993 | Hayes et al. |
| 5,282,166 A | 1/1994 | Ozaki |
| 5,289,116 A | 2/1994 | Kurita et al. |
| 5,295,079 A | 3/1994 | Wong et al. |
| 5,339,279 A | 8/1994 | Toms et al. |
| 5,345,109 A | 9/1994 | Mehta |
| 5,404,480 A | 4/1995 | Suzuki |
| 5,410,547 A | 4/1995 | Drain |
| 5,444,716 A | 8/1995 | Jarwala et al. |
| 5,471,524 A | 11/1995 | Colvin et al. |
| 5,475,624 A | 12/1995 | West |
| 5,477,160 A | 12/1995 | Love |
| 5,490,282 A | 2/1996 | Dreps et al. |
| 5,493,519 A | 2/1996 | Allen, III |
| 5,524,114 A | 6/1996 | Peng |
| 5,528,136 A | 6/1996 | Rogoff et al. |
| 5,543,707 A | 8/1996 | Yoneyama et al. |
| 5,550,480 A | 8/1996 | Nelson et al. |
| 5,566,296 A | 10/1996 | Ohmori et al. |
| 5,581,742 A | 12/1996 | Lin et al. |
| 5,583,874 A | 12/1996 | Smith et al. |
| 5,583,893 A | 12/1996 | Nguyen |
| 5,598,156 A | 1/1997 | Hush et al. |
| 5,604,888 A | 2/1997 | Kiani-Shabestari et al. |
| 5,606,567 A | 2/1997 | Agrawal et al. |
| 5,614,838 A | 3/1997 | Jaber et al. |
| 5,633,899 A | 5/1997 | Fiedler et al. |
| 5,636,163 A | 6/1997 | Furutani et al. |
| 5,673,276 A | 9/1997 | Jarwala et al. |
| 5,675,813 A | 10/1997 | Holmdahl |
| 5,740,086 A | 4/1998 | Komoto |
| 5,778,004 A | 7/1998 | Jennion et al. |
| 5,781,718 A | 7/1998 | Nguyen |
| 5,784,581 A | 7/1998 | Hannah |
| 5,807,767 A | 9/1998 | Stroupe |
| 5,844,856 A | 12/1998 | Taylor |
| 5,845,151 A | 12/1998 | Story et al. |
| 5,859,993 A | 1/1999 | Snyder |
| 5,867,436 A | 2/1999 | Furutani et al. |
| 5,875,132 A | 2/1999 | Ozaki |
| 5,875,198 A | 2/1999 | Satoh |
| 5,883,852 A | 3/1999 | Ghia et al. |
| 5,887,050 A | 3/1999 | Fenske et al. |
| 5,889,936 A | 3/1999 | Chan |
| 5,896,534 A | 4/1999 | Pearce et al. |
| 5,920,483 A | 7/1999 | Greenwood et al. |
| 5,929,651 A | 7/1999 | Leas et al. |
| 5,930,168 A | 7/1999 | Roohparvar |
| 5,937,154 A | 8/1999 | Tegethoff |
| 5,942,911 A | 8/1999 | Motika et al. |
| 5,946,472 A | 8/1999 | Graves et al. |
| 5,951,704 A | 9/1999 | Sauer et al. |
| 5,959,887 A | 9/1999 | Takashina et al. |
| 5,959,911 A | 9/1999 | Krause et al. |
| 5,969,986 A | 10/1999 | Wong et al. |
| 5,990,815 A | 11/1999 | Linder et al. |
| 5,996,102 A | 11/1999 | Haulin |
| 6,002,868 A | 12/1999 | Jenkins et al. |
| 6,023,428 A | 2/2000 | Tran |
| 6,028,439 A | 2/2000 | Arkin et al. |
| 6,044,481 A | 3/2000 | Kornachuk et al. |
| 6,049,896 A | 4/2000 | Frank et al. |
| 6,064,213 A | 5/2000 | Khandros et al. |
| 6,069,494 A | 5/2000 | Ishikawa |
| 6,073,193 A | 6/2000 | Yap |
| 6,074,904 A | 6/2000 | Spikes, Jr. et al. |
| 6,075,373 A | 6/2000 | Iino |
| 6,084,215 A | 7/2000 | Furuya et al. |
| 6,128,242 A | 10/2000 | Banba et al. |
| 6,146,970 A | 11/2000 | Witek et al. |
| 6,148,354 A | 11/2000 | Ban et al. |
| 6,154,803 A | 11/2000 | Pontius et al. |
| 6,157,975 A | 12/2000 | Brief et al. |
| 6,189,109 B1 | 2/2001 | Sheikh et al. |
| 6,202,103 B1 | 3/2001 | Vonbank et al. |
| 6,208,947 B1 | 3/2001 | Beffa |
| 6,232,904 B1 | 5/2001 | Hartmann et al. |
| 6,272,112 B1 | 8/2001 | Orita |
| 6,304,982 B1 | 10/2001 | Mongan et al. |
| 6,320,811 B1 | 11/2001 | Snyder et al. |
| 6,320,866 B2 | 11/2001 | Wolf et al. |
| 6,324,663 B1 | 11/2001 | Chambers |
| 6,330,241 B1 | 12/2001 | Fort |
| 6,343,260 B1 | 1/2002 | Chew |
| 6,345,373 B1 | 2/2002 | Chakradhar et al. |
| 6,351,134 B2 | 2/2002 | Leas et al. |
| 6,360,271 B1 | 3/2002 | Schuster et al. |
| 6,363,085 B1 | 3/2002 | Samuels |
| 6,363,506 B1 | 3/2002 | Karri et al. |
| 6,370,635 B2 | 4/2002 | Snyder |
| 6,380,753 B1 | 4/2002 | Iino et al. |
| 6,393,588 B1 | 5/2002 | Hsu et al. |
| 6,400,173 B1 | 6/2002 | Shimizu et al. |
| 6,404,218 B1 | 6/2002 | Le et al. |
| 6,452,411 B1 | 9/2002 | Miller et al. |
| 6,483,330 B1 | 11/2002 | Kline |
| 6,509,213 B2 | 1/2003 | Noble |
| 6,515,484 B1 | 2/2003 | Bald et al. |
| 6,526,557 B1 | 2/2003 | Young et al. |
| 6,527,563 B2 | 3/2003 | Clayton |
| 6,531,335 B1 | 3/2003 | Grigg |
| 6,535,831 B1 | 3/2003 | Hudson et al. |
| 6,549,155 B1 | 4/2003 | Heminger et al. |
| 6,551,844 B1 | 4/2003 | Eldridge et al. |
| 6,559,666 B2 | 5/2003 | Bernier et al. |
| 6,563,173 B2 | 5/2003 | Bolam et al. |
| 6,571,357 B1 | 5/2003 | Martin et al. |
| 6,603,323 B1 | 8/2003 | Miller et al. |
| 6,627,484 B1 | 9/2003 | Ang |
| 6,627,954 B1 | 9/2003 | Seefeldt |
| 6,703,852 B1 | 3/2004 | Feltner |
| 6,704,888 B1 | 3/2004 | Caudrelier et al. |
| 6,724,848 B1 | 4/2004 | Iyer |
| 6,727,723 B2 | 4/2004 | Shimizu et al. |
| 6,734,693 B2 | 5/2004 | Nakayama |
| 6,735,720 B1 | 5/2004 | Dunn et al. |
| 6,753,238 B2 | 6/2004 | Kurita |
| 6,759,865 B1 | 7/2004 | Gu et al. |
| 6,774,395 B1 | 8/2004 | Lin et al. |
| 6,798,225 B2 | 9/2004 | Miller |
| 6,825,052 B2 | 11/2004 | Eldridge et al. |
| 6,825,683 B1 | 11/2004 | Berndt et al. |
| 6,847,218 B1 | 1/2005 | Nulty et al. |
| 6,849,928 B2 | 2/2005 | Cha et al. |
| 6,856,150 B2 | 2/2005 | Sporck et al. |
| 6,876,214 B2 | 4/2005 | Crook et al. |
| 6,903,562 B1 | 6/2005 | Smith et al. |
| 6,912,778 B2 | 7/2005 | Ahn et al. |
| 6,917,998 B1 | 7/2005 | Giles |
| 6,959,257 B1 | 10/2005 | Larky et al. |
| 6,975,130 B2 | 12/2005 | Yevmenenko |
| 6,978,335 B2 | 12/2005 | Lee |
| 7,036,062 B2 | 4/2006 | Morris et al. |
| 7,102,367 B2 | 9/2006 | Yamagishi et al. |
| 7,112,975 B1 | 9/2006 | Jin et al. |
| 7,113,902 B2 | 9/2006 | Swoboda |
| 7,127,708 B2 | 10/2006 | Gomez |
| 7,138,811 B1 | 11/2006 | Mahoney et al. |
| 7,154,259 B2 | 12/2006 | Miller |

(56) References Cited

U.S. PATENT DOCUMENTS

| | | |
|---|---|---|
| 7,218,134 B1 | 5/2007 | Ho |
| 7,245,134 B2 | 7/2007 | Granicher et al. |
| 7,307,433 B2 | 12/2007 | Miller et al. |
| 7,327,153 B2 | 2/2008 | Weinraub |
| 7,381,630 B2 | 6/2008 | Sawyer |
| 7,536,679 B1* | 5/2009 | O'Connell et al. ........... 717/126 |
| 7,595,746 B2 | 9/2009 | Iorga et al. |
| 7,733,096 B2 | 6/2010 | Lin et al. |
| 7,906,982 B1 | 3/2011 | Meade et al. |
| 7,949,916 B1 | 5/2011 | Ang |
| 8,103,992 B1 | 1/2012 | Chan et al. |
| 8,239,590 B1 | 8/2012 | Wennekamp et al. |
| 8,798,741 B2 | 8/2014 | Ryan et al. |
| 9,470,759 B2 | 10/2016 | Bourassa et al. |
| 9,759,772 B2 | 9/2017 | Kaushansky et al. |
| 2002/0105352 A1 | 8/2002 | Mori et al. |
| 2002/0145437 A1 | 10/2002 | Sporck et al. |
| 2002/0171449 A1 | 11/2002 | Shimizu et al. |
| 2003/0074611 A1 | 4/2003 | Nachumovsky |
| 2003/0084388 A1 | 5/2003 | Williamson, Jr. et al. |
| 2003/0115517 A1 | 6/2003 | Rutten |
| 2003/0206535 A1 | 11/2003 | Shpak |
| 2003/0210031 A1 | 11/2003 | Miller |
| 2003/0210069 A1 | 11/2003 | Kikuchi et al. |
| 2003/0233208 A1 | 12/2003 | Uesaka et al. |
| 2004/0008024 A1 | 1/2004 | Miller |
| 2004/0036493 A1 | 2/2004 | Miller |
| 2004/0075453 A1 | 4/2004 | Slupsky |
| 2004/0175850 A1 | 9/2004 | Shimizu et al. |
| 2004/0181763 A1* | 9/2004 | Soltis et al. ........... 716/4 |
| 2005/0047339 A1 | 3/2005 | Dube et al. |
| 2005/0093571 A1 | 5/2005 | Suaris et al. |
| 2005/0110513 A1 | 5/2005 | Osada et al. |
| 2005/0129033 A1 | 6/2005 | Gordy et al. |
| 2005/0171722 A1* | 8/2005 | Fritzsche ........... 702/122 |
| 2005/0182588 A1 | 8/2005 | Chenoweth et al. |
| 2005/0193266 A1 | 9/2005 | Subramanian et al. |
| 2005/0204223 A1 | 9/2005 | Ong |
| 2005/0237073 A1 | 10/2005 | Miller et al. |
| 2005/0262412 A1* | 11/2005 | Mukai et al. ........... 714/742 |
| 2006/0028897 A1 | 2/2006 | Vernenker et al. |
| 2006/0100812 A1 | 5/2006 | Sturges et al. |
| 2006/0156288 A1* | 7/2006 | Jones et al. ........... 717/124 |
| 2006/0242504 A1 | 10/2006 | Kadota |
| 2006/0273809 A1 | 12/2006 | Miller et al. |
| 2007/0022323 A1* | 1/2007 | Loh ........... G01R 31/31705 714/38.14 |
| 2007/0074191 A1 | 3/2007 | Geisinger |
| 2007/0162729 A1 | 7/2007 | Ryu et al. |
| 2007/0176807 A1 | 8/2007 | Mattes et al. |
| 2007/0245289 A1 | 10/2007 | Suaris et al. |
| 2007/0261009 A1 | 11/2007 | Granicher et al. |
| 2007/0277154 A1 | 11/2007 | Badwe |
| 2008/0040641 A1* | 2/2008 | Blancha et al. ........... 714/745 |
| 2008/0250288 A1 | 10/2008 | Souef et al. |
| 2008/0274629 A1 | 11/2008 | Meyer |
| 2008/0278190 A1 | 11/2008 | Ong et al. |
| 2008/0297167 A1 | 12/2008 | Possa |
| 2009/0001347 A1 | 1/2009 | Kumar et al. |
| 2009/0024381 A1 | 1/2009 | Sakamoto et al. |
| 2009/0066365 A1 | 3/2009 | Solomon |
| 2009/0091347 A1 | 4/2009 | Gohel et al. |
| 2009/0101940 A1 | 4/2009 | Barrows et al. |
| 2009/0112548 A1 | 4/2009 | Conner et al. |
| 2009/0113245 A1 | 4/2009 | Conner |
| 2009/0119084 A1 | 5/2009 | Nagashima et al. |
| 2009/0119542 A1* | 5/2009 | Nagashima et al. ........... 714/33 |
| 2009/0128162 A1 | 5/2009 | Singleton et al. |
| 2009/0138567 A1 | 5/2009 | Hoover et al. |
| 2009/0167583 A1 | 7/2009 | Iorga et al. |
| 2009/0217311 A1* | 8/2009 | Kocyan et al. ........... 719/328 |
| 2009/0299677 A1 | 12/2009 | Torres |
| 2010/0058274 A1 | 3/2010 | Pike et al. |
| 2010/0146338 A1 | 6/2010 | Schalick et al. |
| 2010/0164527 A1 | 7/2010 | Weyh et al. |
| 2010/0174955 A1 | 7/2010 | Carnevale et al. |
| 2010/0180169 A1 | 7/2010 | La Fever et al. |
| 2010/0287424 A1 | 11/2010 | Kwon |
| 2010/0313071 A1 | 12/2010 | Conner |
| 2011/0067040 A1 | 3/2011 | Nagahara et al. |
| 2011/0291693 A1 | 12/2011 | Ong et al. |
| 2012/0198279 A1* | 8/2012 | Schroeder ........... 714/32 |
| 2013/0031276 A1 | 1/2013 | Rathi et al. |
| 2013/0070640 A1 | 3/2013 | Chapman |
| 2013/0110446 A1 | 5/2013 | Bourassa et al. |
| 2013/0111505 A1 | 5/2013 | Frick et al. |

FOREIGN PATENT DOCUMENTS

| | | |
|---|---|---|
| JP | H04-122141 A | 4/1992 |
| JP | H04-122141 A | 4/1992 |
| JP | 2004-199536 A | 7/2004 |
| JP | 2004-199536 A | 7/2004 |
| JP | 2009-031933 | 2/2009 |
| JP | 2009-031933 A | 2/2009 |
| JP | 2009-116878 A | 5/2009 |
| JP | 2009-116878 A | 5/2009 |
| JP | 2011-502265 A | 1/2011 |
| JP | 2011-502265 A | 1/2011 |
| KR | 10-2007-0020247 A | 2/2007 |
| KR | 10-2009-0028569 | 3/2009 |
| KR | 10-2009-0028569 A | 3/2009 |
| KR | 2009-0028569 A | 3/2009 |
| KR | 10-2009-0107579 | 10/2009 |
| KR | 2009-0107579 A | 10/2009 |
| KR | 10-1567830 B1 | 11/2015 |
| WO | 9736230 A1 | 10/1997 |
| WO | WO-97/36230 A1 | 10/1997 |
| WO | 2010/054669 | 5/2010 |
| WO | 2010054669 A1 | 5/2010 |

OTHER PUBLICATIONS

International Preliminary Report on Patentability dated May 8, 2014 in corresponding international application No. PCT/US2012/056250, 6 pgs.
Search Report dated Feb. 24, 2015 in European application No. 12843264.8, 6 pgs.
Search Report dated Feb. 24, 2015 in European application No. 12843399.2, 7 pgs.
Search Report dated Jan. 29, 2015 in European application No. 12842878.6, 8 pgs.
International Search Report dated Mar. 12, 2013 in International Application No. PCT/US2012/056247, 10 pgs.
International Preliminary Report on Patentability dated May 8, 2014 in International Application No. PCT/US2012/056247, 7 pgs.
Full Machine Translation of KR10-2009-0107579, 14 pgs.
Full Machine Translation of JP2009-031933, 24 pgs.
Japanese Office Action for JP2014-538797, 4 pages snd English Translation, 4 pages (dated Mar. 29, 2016).
EPO Communication pursuant to Article 94(3) EPC dated Sep. 16, 2015 in EP application No. 12 842 878.6, 6 pgs.
File History of U.S. Appl. No. 10/828,755 (U.S. Pat. No. 7,307,433), 230 pages (Retrieved Mar. 16, 2017).
File History of U.S. Appl. No. 11/711,382 (U.S. Pat. No. 7,906,982), 497 pages (Retrieved Mar. 16, 2017).
File History of U.S. Appl. No. 11/964,254 (U.S. Pat. No. 7,595,746), 148 pages (Retrieved Mar. 16, 2017).
File History of U.S. Appl. No. 13/284,378 (U.S. Pat. No. 9,470,479), 404 pages (Retrieved Mar. 16, 2017).
File History of U.S. Appl. No. 13/284,483, filed Oct. 28, 2011, 552 pages (Retrieved Oct. 12, 2018).
International Search Report for PCT/US1997/04032, 3 pages (dated Jul. 11, 1997).
Teledyne LeCroy, Protocol Analyzer, Products and Overview, 7 pages (2017). URL: http://teledynelecroy.com/protocolanalyzer [Retrieved Mar. 20, 2017].
Written Opinion for PCT/US2012/056245, 9 pages (dated Mar. 18, 2013).

(56) References Cited

OTHER PUBLICATIONS

Written Opinion for PCT/US2012/056247, 10 pages (dated Mar. 18, 2013).
Intellectual Property India Examination Report for IN Application No. 2494/CHENP/2014, 7 pages (dated Mar. 13, 2019).
Korean Office Action for KR10-2014-7011055 and English Translation, 8 pages (dated Apr. 25, 2019).
J.L. Anderson Jr., "Test application program interface for instrumentation", In: Autotestcon, IEEE, Sep. 21, 2006, pp. 272-276, See abstract; p. 273, paragraph 3: and figure 1.
International Preliminary Report on Patentability dated Apr. 29, 2014 in International Application No. PCT/US2012/056250, 6 pgs.
Bengtsson, S. and Engstrom, O., Interface Charge Control of Directly Bonded Silicon Structures, Journal of Applied Physics, 66: 1231-1239 (1989).
Catalyst Enterprises Inc., TA700 / 800 Series PCI-X, PCI, CPCI, PMC BUS Analyzer-Exerciser User's Manual, 268 pages (2005).
File History of U.S. Appl. No. 10/828,755 (now U.S. Pat. No. 7,307,433), 230 pages (Retrieved Mar. 16, 2017).
File History of U.S. Appl. No. 11/711,382 (now U.S. Pat. No. 7,906,982), 497 pages (Retrieved Mar. 16, 2017).
File History of U.S. Appl. No. 11/964,254 (now U.S. Pat. No. 7,595,746), 148 pages (Retrieved Mar. 16, 2017).
File History of U.S. Appl. No. 13/284,378 (now U.S. Pat. No. 9,470,479), 404 pages (Retrieved Mar. 16, 2017).
File History of U.S. Appl. No. 13/284,491, 543 pages (Retrieved Mar. 16, 2017).
Free Online Dictionary of Computing, "DB-25", 2 pages (Dec. 8, 1996). URL: http://foldoc.org/DB-25 [Retrieved Mar. 20, 2017].
Free Online Dictionary of Computing, "emulation", 2 pages (May 22, 2003). URL: http://foldoc.org/emulation [Retrieved Mar. 20, 2017].
Free Online Dictionary of Computing, "host", 2 pages (Feb. 16, 1995). URL: http: //foldoc.org/host [Retrieved Mar. 20, 2017].
International Search Report for PCT/US2003/014844, 3 pages (dated Sep. 18, 2003).
Krstic, A. et al., Testing High Speed VLSI Device Using Slower Testers, VLSI Test Symposium, 17th IEEE Proceedings, 6 pages (Apr. 25-29, 1999).
Teledyne LeCroy, Protocol Analyzer, Products and Overview, 7 pages (2017). URL: http://teledynelecroy.com/proctoanalyzer [Retrieved Mar. 20, 2017].
USB, Frequently Asked Questions, 3 pages. URL:http://www.usb.org/about/faq/[ Retrieved Mar. 20, 2017].
International search report and written opinion dated Mar. 18, 2013 in international application No. PCT/US2012/056247, 10 pgs.
International Preliminary Report on Patentability dated May 8, 2014 in corresponding international application No. PCT/US2012/056247, 7 pgs.
Majid et al., Stretching the limits of FPGA SerDes for enhanced ATE performance. School of Electrical and Computer Engineering Georgia Institute of Technology, Atlanta, GA, USA (2010), 6 pgs.
International Search Report dated Mar. 18, 2013 in International Application No. PCT/US2012/056245, 9 pgs.
International Preliminary Report on Patentability dated May 8, 2014 in International Application No. PCT/US2012/056245, 6 pgs.

\* cited by examiner

PROGRAMMABLE TEST INSTRUMENT

TECHNICAL FIELD

This disclosure relates generally to a programmable test instrument

BACKGROUND

Automatic test equipment (ATE) plays a role in the manufacture of electronics, such as semiconductor devices and circuit board assemblies. Manufacturers generally use automatic test equipment, or "tester instruments", to verify the operation of devices during the manufacturing process. Such devices are referred to as a "device under test" (DUT) or a "unit under test" (UUT). Early detection of faults eliminates costs that would otherwise be incurred by processing defective devices, and thus reduces the overall costs of manufacturing. Manufacturers also use ATE to grade various specifications. Devices can be tested and binned according to different levels of performance in areas, such as speed. Devices can be labeled and sold according to their actual levels of performance.

SUMMARY

In general, in one aspect, a test instrument includes a first processing system that is programmable to run one or more test programs to test a device interfaced to a test instrument, and that is programmed to control operation of the test instrument, and a second processing system that is dedicated to device testing. The second processing system being programmable to run one or more test programs to test the device, and the first processing system has a first application programming interface (API) and the second processing system has a second API, the first API and the second API being different APIs, the first API and the second API having at least some duplicate functions.

In general, in another aspect, a method performed on a test instrument includes receiving a test program at a first processing system that is programmable to run one or more test programs to test a device interfaced to a test instrument, and that is programmed to control operation of the test instrument, generating, based on the test program, an altered test program that is executable on a second processing system, the second processing system being dedicated to device testing and being programmable to run one or more test programs to test the device, and transmitting the altered test program to the second processing system.

Aspects may include one or more of the following features. Functions of the first API are associated with corresponding functions of the second API. Functions of the first API are configured to call functions of the second API in response to information received by the first processing system. The information includes programming code written using functions of the first API, the functions of the first API calling functions of the second API to configure the programming code to run on the second processing system. Configuring the programming code to run on the second processing system includes generating code using functions associated with the second API in response to use of corresponding functions of the first API. The first processing system is programmable to generate a user interface, the user interface for interacting with the first processing system and for interacting with the second processing system through the first API and the second API. The first processing system is programmable to generate a user interface, the user interface for interacting with the second processing system through the second API. The first processing system is programmed to run one or more test programs to test the device interfaced to the test instrument, and the second processing system is not programmed to run one or more test programs to test the device. The first processing system is not programmed to run one or more test programs to test the device interfaced to the test instrument, and the second processing system is programmed to run one or more test programs to test the device. The test instrument further includes one or more ports configured to mate to the device, the first processing system is configured to send test data to the device through the one or more ports, or the second processing system is configured to send test data to the device through the one or more ports.

The first processing system has a first application programming interface (API) and the second processing system has a second API, the first API and the second API being different APIs, the first API and the second API having at least some duplicate functions. The test program includes one or more calls to functions of the first API. Generating the altered test program includes identifying one or more corresponding functions of the second API that correspond to the one or more functions of the first API. Generating the altered test program includes replacing the one or more calls to functions of the first API with one or more calls to corresponding functions of the second API. The altered test program is executed on the second processing system to test the device. A development environment associated with the second processing system is provided that allows the altered test program to be modified at the second processing system.

Two or more of the features described in this disclosure, including this summary section, may be combined to form embodiments not specifically described herein.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DETAILED DESCRIPTION

Described herein is a test instrument that may include multiple processing layers (sometimes referred to as "tiers"). The multiple processing layers may include respective application programming interfaces (APIs) that include function libraries. The function libraries can store various functions that can be called by a program such as a test program or test logic that has been provided to the test instrument at least one level. In some examples, a first layer may programmed to run one or more test programs to test a device interfaced to the test instrument, and may also be programmed to control operation of the test instrument. A second layer of the same test instrument may be dedicated to device testing and may also run one or more test programs to test the device.

The first layer may include a first API and the second layer may include a second API, and the first API and the second API may differ from each other in some way. To allow test programs to be generated at the first layer and executed on the second layer, the first API and the second API may include at least some duplicate functions (e.g., a function of the first API may correspond to a function of the second API). Thus, a test program generated at the first layer (e.g., a test program that includes or calls functions of the first API) can be made compatible with a processing device of the second layer, as at least some of the functions of the first API have counterpart functions associated with the second API.

In some examples, the first layer may store associations or mappings between functions of the first API and corresponding functions of the second API. The stored associations and mappings can be used to alter or translate a test program generated at the first layer into a form that is suitable for execution at the second layer (e.g., by replacing or modifying functions of the first API in the test program to correspond to functions of the second API). The altered test program can then be transmitted to the second layer for execution.

Figure 1:
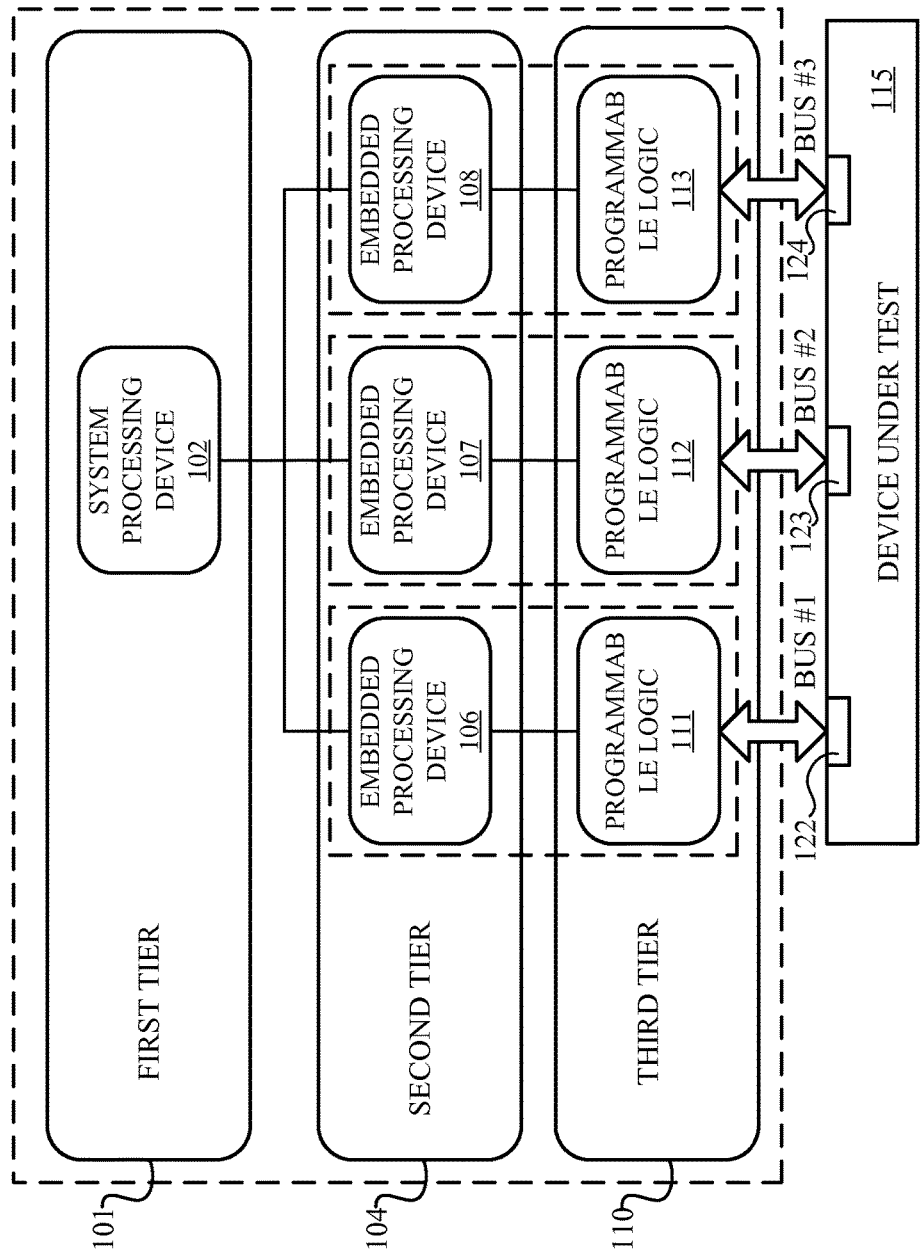
FIG. 1 is a block diagram of an example test instrument.

FIG. 1 is a block diagram of an example implementation of the foregoing test instrument 100. In FIG. 1, test instrument 100 includes a three-tiered processing system. However, in other example implementations, there may be more, or fewer, tiers. The different tiers of test instrument 100 reflect the relative relationship of the tiers to the DUT. In this example, first tier 101 includes a computer 102. Computer 102 controls various features of test instrument 100, such as communication with an external network. In addition, computer 102 is programmable to perform various testing operations, as described below. Second tier 104 includes one or more processing devices 106 to 108 that are dedicated to testing. For example, processing devices 106 to 108 typically do not perform non-test functions like test instrument control and network communication. Third tier 110 includes logic 111 to 113 that is programmable both to act as an interface to a DUT 115 and to perform one or more test operations on the DUT.

In this example first tier 101, computer 102 includes one or more processing devices, such as one or more microprocessors or a single multi-core microprocessor (not shown). Computer 102 also includes memory (not shown) that stores executable code to control test instrument communication with the external environment, and to perform various "housekeeping" functions to control operation of test instrument 100. For example, computer 102 may be responsible for exchanging communications between the test instrument and one or more external entities over a network interface, scanning the test instrument for malware, memory management, power control, and other functions that are not specifically related to testing the DUT.

Computer 102 is also programmable to perform test operations on a DUT (e.g., 115) interfaced to test instrument 100. The test operations may include, but are not limited to, testing bus speed, reaction time, or any other appropriate operational aspects of the DUT. In general, the testing that is performed is dependent upon the type of device being tested, and the information sought during testing.

One or more test programs may be loaded into memory on computer 102, and executed by processing device(s) in computer 102 in order to perform the testing. While performing testing, computer 102 may continue to perform other functions, such as those described above, to keep test instrument 100 operational. Consequently, the test latency (e.g., the amount of time between the start of a test and receipt of test results) can be on the order of milliseconds. Furthermore, timing variability can also be affected by the computer 102 performing system functions, (e.g., virus scanning) during one run of a test but not during another. This could result in consecutive steps of a test sequence executing more closely in time when the virus scan is not running relative to when the virus scan is running. This is but an example of the test latency. In different systems, numerous factors may have an effect on test latency, such as the speed of the processing device(s) in computer 102, the amount of memory available in computer 102 to run the test programs, a division of attention among processing devices, and so forth.

A possible advantage of performing testing via computer 102 relates to development costs of test programs. More specifically, computer 102 may run a windowing, or other relatively user-friendly, operating system. Tools available for development of test programs on such an operating system are typically widely available, and generally familiar to test program developers. As a result, the cost of developing test programs on computer 102, to run on computer 102, can be less than the cost of developing test programs to run on the other tiers of the multi-tiered architecture. This generalization, however, may not apply in all cases.

In this example, second tier 104 includes multiple embedded processing devices 106 to 108. Here, three embedded processing devices are shown; however, test instrument 100 may include any appropriate number of embedded processing devices, e.g., one, two, four, five or more. These processing devices are embedded in the sense that they are incorporated into test instrument 100; and are dedicated to performing test functions (e.g., to testing DUTs interfaced to test instrument 100). Embedded processing devices 106 to 108 typically are not responsible for test instrument operations like the "housekeeping" operations described above that are performed by computer 102. However, in some implementations, embedded processing devices 106 to 108 may be programmed to perform one or more such operations, or other operations not specifically directed to testing DUTs.

Each embedded processing device 106 to 108 may include, e.g., a microcontroller or a microprocessor having a single core or multiple cores. Each microprocessor is programmable, either directly or via computer 102. For example, a user of test instrument 100 may interact with the operating system of computer 102 to program an embedded processing device 106. Alternatively, there may a direct interface, e.g., hardware or software, through which each embedded processing device may be programmed. Programming, in this context, refers to storing one or more test programs onto a respective embedded processing device, which can be executed on that embedded processing device to test a DUT.

As shown in FIG. 1, each embedded processing device is interfaced to computer 102 and to respective programmable logic (in this example, a field programmable gate array (FPGA)). As explained below, each FPGA acts as an interface to a separate DUT (not shown) or to a portion of a single DUT (e.g., a bus 122, 123, 124 on that DUT, as shown) for testing. Accordingly, in this example, each embedded processing device may be programmed with a test program designed specifically for the corresponding DUT, or portion thereof being tested. As noted, an appropriate test program may be loaded directly into the embedded processing device or it may be loaded via computer 102. Each embedded processing device may execute its own test program separately, and concurrently with, other embedded processing devices. In some implementations, there may be coordination among the embedded processing devices as to how their respective test programs are to be executed. Such coordination maybe implemented by the embedded processing device themselves or by computer 102. In some implementations, the coordination may involve devices at different tiers of the architecture. In some implementations, the different embedded processing devices 106 to 108 may implement different portions (e.g., modules) of the same test program, with or without appropriate coordination.

A possible advantage of performing testing via an embedded processing device relates to test latency and timing variability. More specifically, because the embedded processing devices are dedicated to testing, their resources are not typically taxed by other tasks. As a result, testing latency can be less than that achieved by computer 102, and timing variability can be reduced. For example, test latency for an embedded processing device can be on the order of microseconds. This, however, is but an example of embedded processing device test latency. In different systems, numerous factors may have an effect on test latency, such as processing device speed, the amount of memory available to run the test programs, and so forth. Accordingly, the foregoing generalization may not apply in all cases.

Furthermore, tools are available for development of test programs on the embedded processing devices. As a result, the cost of developing test programs targeting an embedded processing device, to run on an embedded processing device, can be less than the cost of developing test programs to run on hardware, such as an FPGA. In some examples, cost issues can relate to the commonness of the skill sets need to program in the various tiers, and to the maturity of the respective development environments. Programming for the embedded tier versus the system tier may require more advanced SW skills. These skills may be less common and more expensive to develop/outsource. System tier development tools are quite refined and powerful relative to the corresponding tools for the embedded tier. This may reduce the cost of development for the system tier (all other things being equal). In addition, the cost of debugging test programs on an embedded processing device can be higher than the cost of debugging those tests on the system processing device for similar reasons. The debugging tools available on the system processing device may be less expensive, more powerful, and more familiar than similar tools available on the embedded processing devices.

Third tier 110 includes programmable logic, e.g., FPGAs 111 to 113, although other types of programmable logic may be used in lieu of FPGAs. Each FPGA is configured by loading a program image into the FPGA. This program image is referred to as an "FPGA load". In this example, each FPGA is configured to act as an interface between a DUT, or portion thereof (e.g., a DUT bus) and test instrument 100. For example, an FPGA may specify a port width, port speed (e.g., 10 MHz to 400 MHz), the number of input ports, the number of output ports, and so forth.

First tier 101 computing device(s) (e.g., computer 102) and second tier 104 computing device(s) (e.g., embedded processing devices 106 to 108) access DUT 115 through third tier 110. For example, as shown in FIG. 1, each embedded processing device may communicate with DUT 115 through a corresponding FPGA. Computer 102 may communicate with DUT 115 through one or more FPGAs, depending upon which DUT, or portion of a DUT, is being currently tested. In some implementations, each interface implemented by an FPGA is programmable. In other implementations, the interface implemented by each FPGA is static (e.g., not programmable).

Each FPGA may also be configurable to perform one or more tests on a corresponding DUT, or portion thereof to which the FPGA is interfaced. For example, the FPGA load for each FPGA may include one or more test routines that are run by the FPGA to test various aspects of the DUT. As above, the routines that are implemented depend upon the device being tested, and the information sought during testing. Test routines run by each FPGA may be run independently of other test routines run by other FPGAs, or there may be coordination among the various FPGAs. Each FPGA may execute its own test routine separately, and concurrently with, other embedded processing devices. In some implementations, there may be coordination among the FPGAs as to how their respective test programs are to be executed. Such coordination may be implemented by the FPGAs themselves, by their corresponding embedded processing devices, or by computer 102. In some implementations, the coordination may involve devices at different tiers of the architecture. For example, computer 102, in concert with embedded processing devices 106 to 108, may coordinate operation of respective FPGAs 111 to 113. In some implementations, the different FPGAs may implement different portions (e.g., modules) of the same test routine, with or without appropriate coordination.

A possible advantage of performing testing via an FPGA relates to test latency and to reducing timing variability. More specifically, because the FPGAs are hardware devices, they are able to run at higher speeds than the test routines programmed into either the embedded processing devices 106 to 108 or computer 102. As a result, testing latency can be less than that achieved by embedded processing devices 106 to 108 or computer 102. For example, test latency for an embedded processing device can be on the order of nanoseconds. This, however, is but an example of FPGA test latency. In different systems, numerous factors may have an effect on test latency. Accordingly, the foregoing generalization may not apply in all cases.

In some implementations, testing may be performed exclusively by one tier or another of the architecture. For example, computer 102 may be programmed to run one or more test programs to test a DUT, while devices on other tiers of the architecture do not perform DUT tests. Embedded processing devices 106 to 108 may be programmed to run one or more test programs to test a DUT, while devices on other tiers of the architecture do not perform DUT tests. FPGAs 111 to 113 may be configured to run one or more tests on the device, while devices on other tiers of the architecture do not perform DUT tests. Devices that are not performing tests are not necessarily dormant during this time. For example, computer 102 may continue to perform the housekeeping operations described above; the FPGAs may continue to route data to/from the DUT (i.e., to act as interfaces to the DUT); and the embedded processing devices may continue to be active in coordination or other communication (e.g., transmitting test results from the FPGAs to computer 102).

In other implementations, testing may be performed by different tiers of the architecture concurrently or in concert. For example, two or more of computer 102, embedded processing devices 106 to 108, and FPGAs 111 to 113 may act in coordination, at the same time or within the same test sequence, to perform one or more test operations on a single DUT or on multiple DUTs. To effect such coordination, appropriate programming is loaded into computer 102 and/or embedded processing devices 106 to 108, and/or an appropriate image is loaded into the FPGAs. By way of example, a first test may be performed on a DUT by computer 102; a second test may be performed on the DUT by embedded processing device 106; and a third test may be performed on the DUT by FPGA 111. The first, second and third tests may be separate tests, or part of the same test sequence. Data from the first, second and third tests may be combined, e.g., in computer 102, and processed to obtain the appropriate test results. These test results may be sent to an external computer (not shown) for analysis and reporting. Any tier of the architecture or another (e.g., third party) computer (not shown) may perform the coordination.

In implementations where one or more tiers of the architecture have not been programmed, the unprogrammed tiers may be bypassed (at least as far as their test functionality is concerned). The unprogrammed tiers may be pre-programmed or pre-configured to perform various functions, such as those described above relating to programming and communication among the tiers and with an external network.

Devices at the various tiers may be programmed or configured in real-time. In this context, "real-time" includes programming at test time or shortly before test time. That is, the test instrument need not come pre-programmed with test programs that are to be run on a DUT. Those test programs may be incorporated into the instrument at the appropriate time. Existing test programs on the test instrument may likewise be replaced with new test programs, as appropriate.

Figure 2:
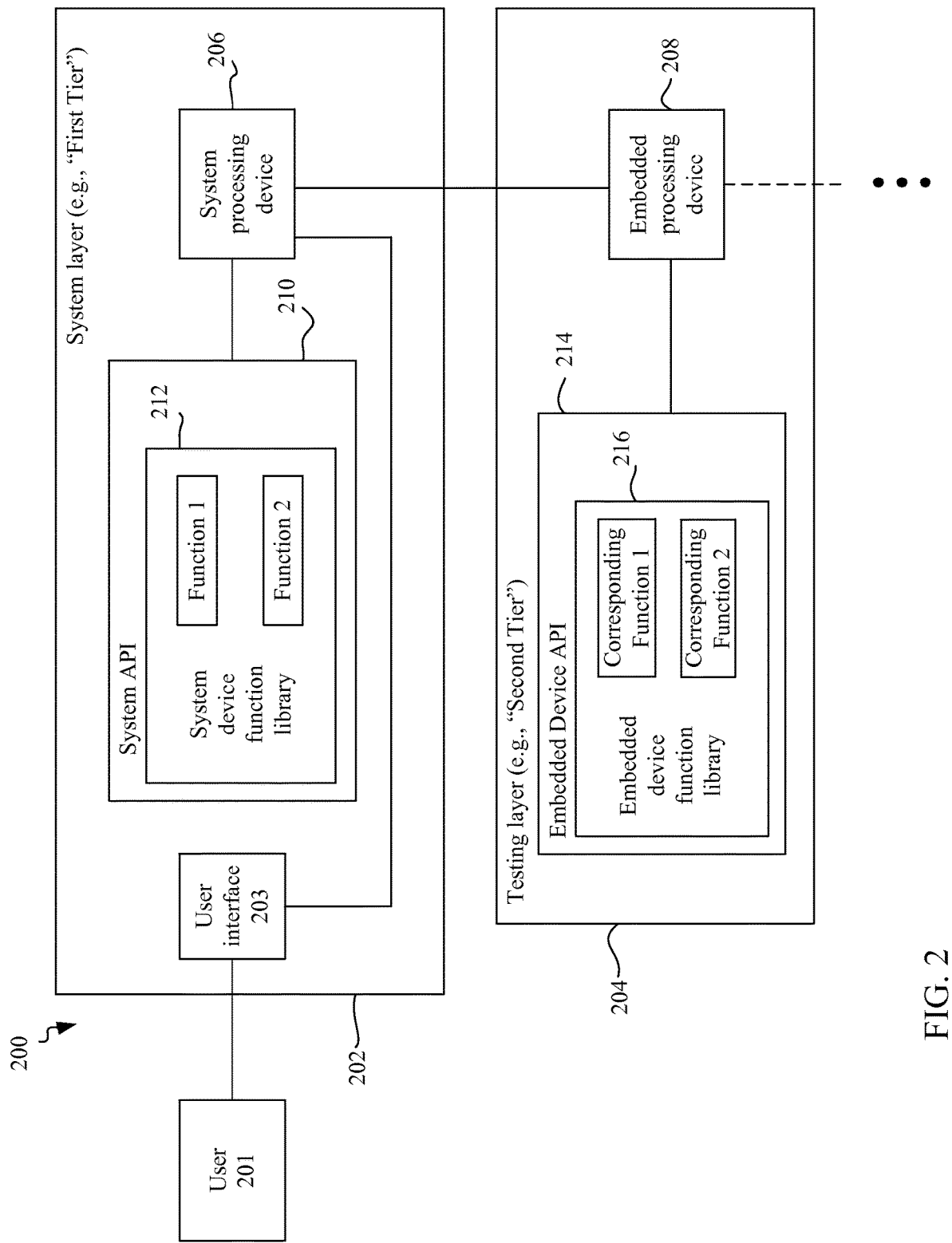
FIG. 2 is a block diagram of showing examples of features that may be incorporated into the example test instrument of FIG. 1

FIG. 2 shows a test instrument 200 that includes a multi-tiered architecture. In the example of FIG. 2, the test instrument 200 includes a system layer 202 (e.g., the "first tier") and a testing layer 204 (e.g., the "second tier). However, in other example implementations, there may be more, or fewer, tiers. As discussed above, the different tiers of the system 200 reflect the relative relationship of the system layer 202 and the testing layer 204 to a DUT (not shown). In this example, the system layer 202 can provide similar functionality to the first tier 101 shown in FIG. 1, and may include a system processing device 206. For example, the system processing device 206 may control various features of the test instrument 200, such as communication with an external network or other general computing tasks (e.g., controlling programs unrelated to testing DUTs, such as email programs and word processing programs). In addition, the system processing device 206 can be programmable to perform various testing operations, as described below.

The testing layer 204 includes an embedded processing device 208 that is dedicated to one or more specialized tasks, such as device testing. While the testing layer 204 may include more than one embedded processing device (e.g., as shown in the second tier 104 of the test instrument 100 (FIG. 1)), only one embedded processing device is shown for the sake of simplicity. In some examples, the embedded processing device 208 does not perform non-test functions like test instrument control and network communication. The test instrument may also include one or more additional layers, such as the third tier 110 shown in FIG. 1, which may in turn communicate with one or more DUTs.

The system layer 202 also includes a system application programming interface (API) 210. In general, an API is a set of data structures, functions, protocols, routines and tools for accessing and interacting with an application (e.g., software running on one or more of the system processing device 206 and the embedded processing device 208). An application programming interface may be language dependent or language independent. A language dependent API is available only in a particular programming language, while a language independent API is not bound to a particular language, system or process. In some examples, language independent APIs can be accessed from (e.g., have their functions called using) more than one programming language. The system API 210 includes a system device function library 212 that stores a number of functions associated with the system API 210 (e.g., Function 1 and Function 2). A function (e.g., Function 1) may, when called, cause the system processing device 206 to perform one or more operations. For example, a function (e.g., Function 1) can cause a processing device to access a register associated with an FPGA (e.g., an FPGA associated with the third tier 110). Other functions may access a power supply or temperature sensor (e.g., inside the instrument) to monitor the status of the instrument.

In some examples, a user 201 may wish to develop test logic that can be used by the test instrument 200 to test a DUT. The system layer 202 may provide a development environment that includes, or has access to, the system device function library 212. While some system layers are not typically able to provide a development environment that provides the ability for the user 201 to create test logic (e.g., because test logic is executed on the embedded processing device 208 in the testing layer 204, and functions syntax and availability may vary between layers of the test instrument 200), the techniques described herein allow the user 201 to create test logic at the system layer 202 that can be executed at the testing layer 204 to test DUTs connected to the test instrument 200 (e.g., DUTs connected to a third layer, such as the third tier 110).

In some examples, to allow for test logic creation at the system layer 202, the system layer 202 and the testing layer 204 can be provided with respective APIs that include functions that correspond to one another. For example, the embedded device API 214 can include an embedded device function library 216 that stores functions (e.g., Corresponding Function 1 and Corresponding Function 2) that correspond to functions of the system device function library (e.g., Function 1 and Function 2, respectively). Such an arrangement allows, for example, the user 201 to develop test logic at the system layer 202 that can be executed by the embedded processing device 208 associated with the testing layer 204. For example, because at least some of the functions of the embedded device function library 216 have respective counterpart functions in the system device function library, test logic developed at the system layer 202 can include functions calls that properly call the desired functions of the embedded device function library 216. As a result, test logic can be created that can be executed at least in part on the system processing device 206 and that properly calls functions of the testing layer 204 (or other layers) when necessary. For example, some functions of system device function library 212 can be wrappers to their embedded device function library 216 counterparts.

Providing similar functions at both the system layer 202 and the testing layer 204 allows developers who are unfamiliar with, for example, developing test logic at the test level 204, to develop usable test logic at the system layer 202 (e.g., in a development environment that the developer may be more familiar with). However, in some examples, some test logic or portions thereof must be developed at the testing layer 204 due to performance demands of certain test requirements, such as latency or timing variability constraints.

Figure 3:
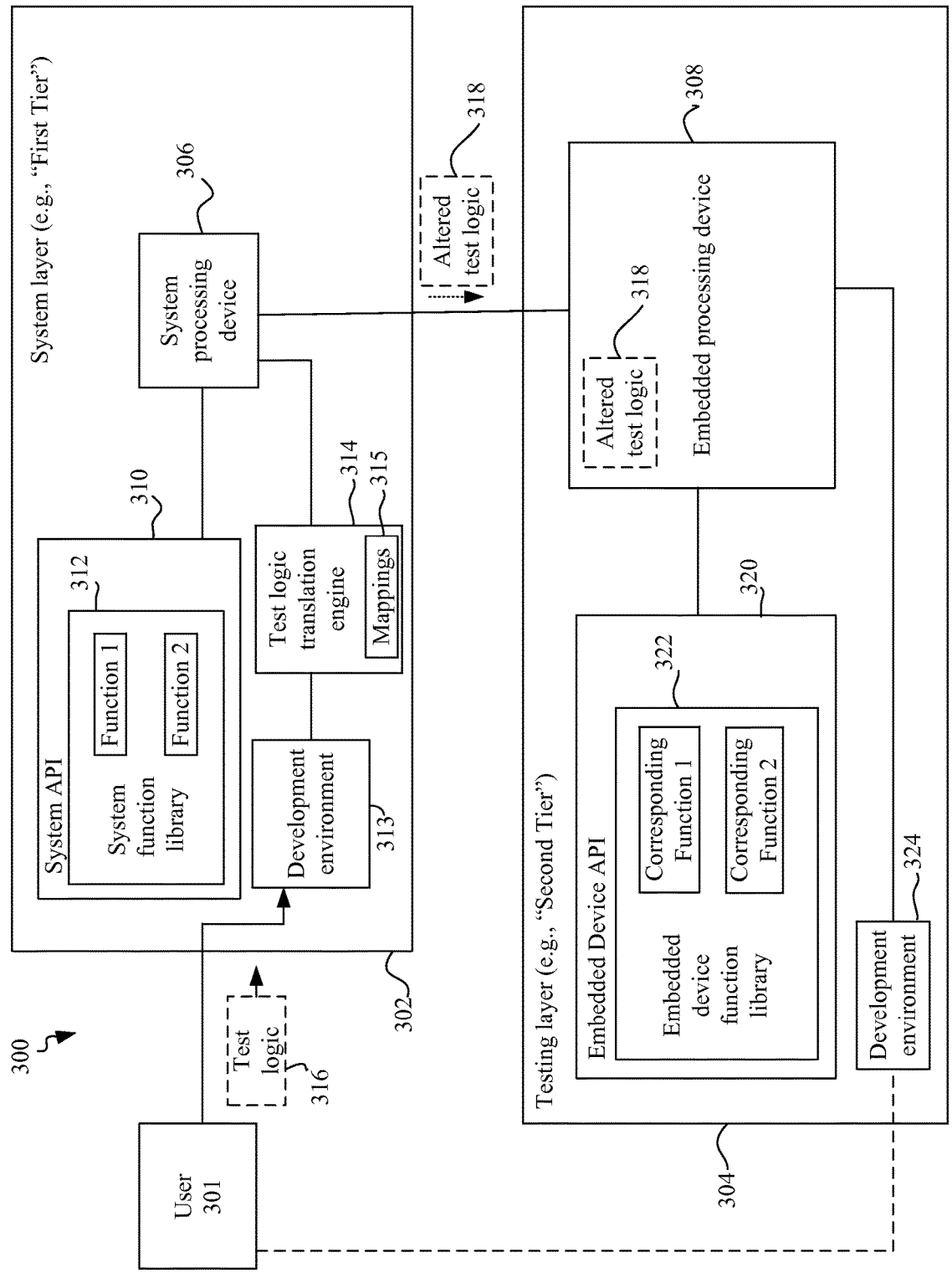
FIG. 3 is a block diagram of an example test system.

FIG. 3 shows a test instrument 300 that includes a system layer 302 and a testing layer 304. Like the test instrument 200 discussed above with regard to FIG. 2, the test instrument 300 includes features that allow a user 301 to generate test logic (e.g., test logic 316) that can be transferred or ported to the testing layer 304 for execution. For example, the user 301 may develop test logic 316 within a development environment 313 associated with the system layer 302. In some examples, the development environment 313 can run on a layer or machine different than the system layer 302. While the test logic may include functions (e.g., Function 1 and Function 2) provided by a system device function library 312 associated with a system API 310, the user 301 may desire to have some or all of the test logic 316 be executed on an embedded processing device 308 associated with the testing layer 304.

To facilitate the execution of test logic 316 that uses functions from the system function library 312 (e.g., and not the embedded device function library 322), the system layer 302 may use a test logic translation engine 314 to alter, translate, or otherwise modify the test logic 316 into a format that can be executed by the embedded processing device 308. In some examples, the test logic translation engine 314 includes one or more function mappings 315 that specify associations between a function of the system function library 312 and a corresponding function of the embedded device function library 322. Using the mappings 315, the test logic translation engine can modify the test logic 316 to provide altered test logic 318 that is suitable for execution on the embedded processing device 308. In some examples, the test logic translation engine 314 can use the mappings 315 to replace functions (e.g., Function 1) associated with the system function library 312 with its counterpart function in the embedded device function library 322 (e.g., Corresponding Function 1).

After the test logic translation engine 314 has generated the altered test logic 318, the system processing device 306 of the system layer 302 can provide the altered test logic 318 to the embedded processing device 308 for execution. Before the embedded processing device 308 executes the altered test logic 318, the testing layer 304 may perform one or more tasks, such as error checking, compilation, or other pre-processing operations (e.g., testing layer 304 (and specifically the embedded device function library 322) can error check the altered test logic 318). In some examples, some of these checks are of the behavior of this test logic as it runs, and some of these checks are of the altered test logic 318 binary itself. These checks can be performed, for example, when the altered test logic 318 is loaded. Furthermore, in some examples, it may be desirable to modify the altered test logic 318 prior to execution on the embedded processing device 308 (e.g., test performance requirements, such as latency or response time specifications, may require further modifications to be made to the altered test logic 318 at the testing layer 304). To facilitate further modification of the altered test logic 318 at the testing layer 304, the testing layer 304 may also include its own development environment 324 through which the user 301 may access and alter the altered test logic 318 that has been ported over from the system layer 302. In some examples, the first tier may have a larger latency and timing variability associated with it than the second tier. Furthermore, in some cases, action by the test logic can trigger a UUT response that completes faster than the first tier's timing is latent or variable. In these cases, some SW logic optimizations might not produce a measurable performance improvement in the first tier yet might produce a dramatic improvement in the second tier. In some examples, the system layer 202 (or 302) may also provide a user interface 203 (FIG. 2) that can be used to interact with one or both of the system API 210/310 and the embedded device API 214/314. For example, the user interface can act as a common interface to both development environments 313 and 324, which may allow the user 301 to modify test logic at either the system layer 302 or the testing layer 304. Thus, the techniques described above can allow the user 301 to generate early test logic at the system layer 302 (e.g., in a development environment that is familiar to the user 301), and the test logic can then be translated into altered test logic that is ported to the testing layer 304 for further modification and/or execution. These techniques can also allow user 301 to debug the early test logic at the system layer 302 using more powerful and familiar debugging tools. These techniques can be used instead of, or in combination with, the techniques discussed above with regard to FIG. 2. For example, the existence of corresponding functions in function libraries of the system and testing layers allows the test logic translation engine 314 (and its associated mappings 315) to identify appropriate functions at the testing layer 304 that should be substituted for system layer functions in the test logic 316.

Figure 4:
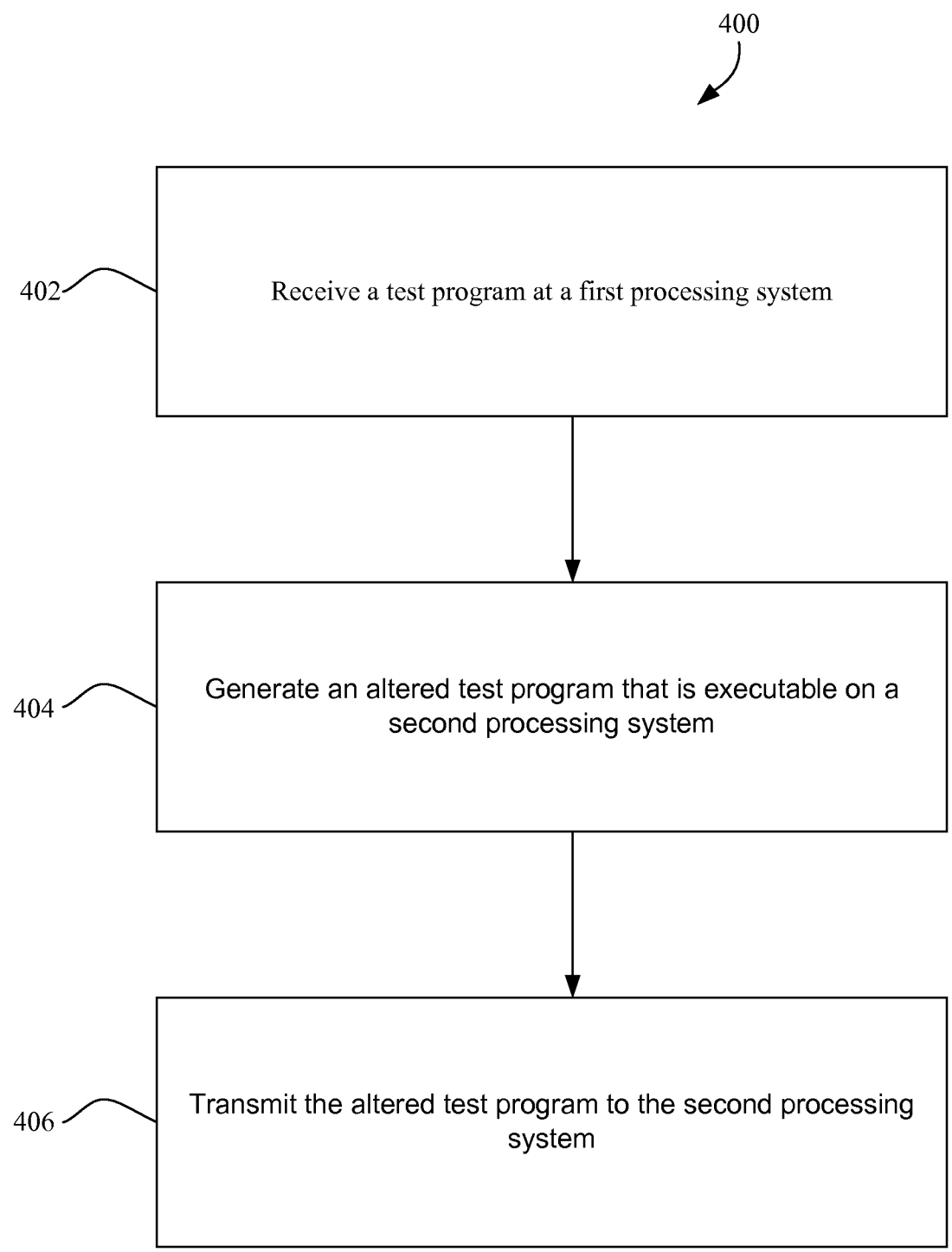
FIG. 4 is a block diagram of an example tester included in the test system.

FIG. 4 illustrates a process 400 that allows a test program to be created at a first processing system and to be modified for eventual execution at a second processing system. The process 400 can be executed, for example, on a test instrument. A test program is received at a first processing system (402). For example, a user can generate a test program using a development environment associated with the system layer 302. The user may also upload an existing test program 302 to the first processing system via a network connection or a suitable storage device (e.g., a portable storage device, such as a universal serial bus (USB) thumb drive). In some examples, the first processing system is programmable to run one or more test programs to test a device interfaced to a test instrument, and is programmed to control operation of the test instrument.

An altered test program is generated that is executable on a second processing system (404). In some examples, the second processing system is dedicated to device testing and is programmable to run one or more test programs to test the device. The first processing system may have a first application programming interface (API) and the second processing system may have a second API, where the first API and the second API are different APIs, and the first API and the second API have at least some duplicate functions. While the test program may include one or more functions of the first API, generating the altered test program may include identifying one or more functions of the second API that correspond to the one or more functions of the first API. Generating the altered test program may also include replacing the one or more functions of the first API with the one or more corresponding functions of the second API.

The altered test program is transmitted to the second processing system. For example, after the altered test program has been generated in a form that is suitable for execution on the second processing system, the altered test program can be provided to the second processing system.

The second processing system may also provide a development environment that allows the altered test program to be modified at the second processing system.

While some of the foregoing examples describe providing altered test logic to one embedded processing device of the testing layer, the system layer can provide altered test logic to multiple embedded processing devices of the testing layer. In some examples, more than one embedded processing device can be associated with one or more shared APIs. Similarly, one or more system processing devices can be associated with one or more shared APIs.

The foregoing describes performing testing using a system processing device, embedded processing devices, or programmable logic. However, testing, as described herein, may be performed using a combination of system processing device, embedded processing devices, or programmable logic. For example, each of these different elements may run on or more test programs simultaneously to test the same device or portion thereof. Likewise, these different elements may coordinate testing so that, e.g., a system processing device (e.g., 102 of FIG. 1) performs a first part of a test sequence, an embedded processing device (e.g., 106 of FIG. 1) performs a second part of the same testing sequence, and programmable logic (e.g., FPGA 111 of FIG. 1) performs a third part of the same testing sequence. Any appropriate coordination may take place between the different programmable elements of the test instrument described herein.

Furthermore, in some implementations, a tier of processing may be circumvented. For example, testing may occur using a system processing device (e.g., 102) and programmable logic (e.g., FPGA 111), but not an embedded processing device. In such implementations, communications between the system processing device and the programmable logic may pass through an embedded processing device or bypass the embedded processing device tier altogether.

In some implementations, there may be more than three tiers of processing devices. For example, there may be two tiers of embedded processing devices (resulting, e.g., in four tiers total). For example, a single embedded processing device may be used to coordinate testing of a single device, and different embedded processing devices (under the direction of that single embedded processing device) may be used to test different aspects or features of that single device.

In some implementations, one or more tiers of processing devices may be eliminated from the system of FIG. 1. For example, some implementations may not include a tier of embedded processing devices. In such example systems, there may be only a system processing device (e.g., 102 of FIG. 1) and programmable logic (e.g., FPGAs 111 to 113. In this regard, any appropriate combination of tiers may be employed in the test instrument described herein.

In some implementations, the system processing device (e.g., 102 of FIG. 1) may be external to the test instrument. For example, an external computer may be employed to control operations of the test instrument, and may interact with embedded processing device(s) and programmable logic on the test instrument in the manner described herein. In other implementations, the system processing device may be part of the test instrument or remote from the test instrument (e.g., connected to the test instrument over a network).

In some implementations, the programmable logic may be replaced with non-programmable logic. For example, rather than using an FPGA, one or more application-specific integrated circuits (ASICs) may be incorporated into the test instrument in place of, or in addition to, the programmable logic described herein.

The functionality described herein, or portions thereof, and its various modifications (hereinafter "the functions"), are not limited to the hardware described herein. All or part of the functions can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions All or part of the functions can be implemented as special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Components of different embodiments described herein may be combined to form other embodiments not specifically set forth above. Components may be left out of the circuitry shown in FIGS. 1 to 4 without adversely affecting its operation. Furthermore, various separate components may be combined into one or more individual components to perform the functions described herein.

Other embodiments not specifically described herein are also within the scope of the following claims.

What is claimed is:

1. A test instrument comprising:
    a first processing system comprising one or more processors, the first processing system being programmed to coordinate with a second processing system to test a device under test interfaced to the test instrument, the first processing system being programmed to perform device testing and tasks other than device testing;
    the second processing system comprising one or more processors, the second processing system being dedicated to device testing, the second processing system being programmed to run one or more test programs to test the device under test, the first processing system and the second processing system being in a tiered processing system, with the second processing system being at a lower tier than the first processing system, and with the second processing system being programmed to receive a test program from the first processing system and to run the test program to test the device under test; and logic that is programmable both to act as an interface to the device under test and to perform one or more test operations on the device under test, the logic being a third tier in the tiered processing system and at a lower tier than the second processing system;

wherein the first processing system comprises a function library for developing the test program at the first processing system, the first processing system comprising a translation engine to alter the test program developed on the first processing system, the translation engine for altering the test program to allow the test program to run on the second processing system, and the first processing system being programmed to send the test program to the second processing system to run the test program to test the device under test.

2. The test instrument of claim 1, wherein the first processing system has a first application programming interface (API) and the second processing system has a second API, the first API and the second API being different APIs, the first API and the second API having at least some duplicate functions; and wherein functions of the first API are associated with corresponding functions of the second API.

3. The test instrument of claim 2, wherein functions of the first API are configured to call functions of the second API in response to information received by the first processing system.

4. The test instrument of claim 3, wherein the information comprises programming code of the test program written using functions of the first API.

5. The test instrument of claim 2, wherein altering the test program comprises configuring programming code in the test program to run on the second processing system by generating code using functions associated with the second API based on use of corresponding functions of the first API.

6. The test instrument of claim 2, wherein the first processing system is programmed to generate a user interface, the user interface for interacting with the first processing system and for interacting with the second processing system through the first API and the second API.

7. The test instrument of claim 2, wherein the first processing system is programmed to generate a user interface, the user interface for interacting with the second processing system through the second API.

8. The test instrument of claim 1, wherein the first processing system is controllable to run one or more test programs to test the device under test interfaced to the test instrument; and wherein the second processing system is controllable not to run one or more test programs to test the device under test.

9. The test instrument of claim 1, wherein the first processing system is controllable not to run one or more test programs to test the device under test interfaced to the test instrument; and wherein the second processing system is controllable to run one or more test programs to test the device under test.

10. The test instrument of claim 1, further comprising:

one or more ports configured to mate to the device under test;

wherein the first processing system is configured to send test data to the device under test through the one or more ports; or wherein the second processing system is configured to send test data to the device under test through the one or more ports.

11. The test instrument of claim 1, wherein the one or more processors of the first processing system comprise one or more microprocessors programmed to run a general purpose operating system; and wherein the one or more processors of the second processing system comprise one or more embedded microprocessors, each of the one or more embedded microprocessors being programmed to test a corresponding device interfaced to the test instrument but not to perform tasks unrelated to device testing.

12. The test instrument of claim 1, wherein the second processing system comprises a development environment to enable alteration of the altered test program to affect operation of the altered test program on the second processing system.

13. The test instrument of claim 1, wherein the first processing system is configured to perform part of testing on the device under test and the second processing system is configured to perform another part of testing on the device under test.

14. A method performed on a test instrument, the method comprising:

developing, based on a function library, a test program at a first processing system that is programmed to coordinate with a second processing system to test a device under test interfaced to the test instrument, the first processing system comprising one or more processors, the first processing system and the second processing system being in a tiered processing system, with the second processing system being at a lower tier than the first processing system, the first processing system being programmed to perform testing and tasks other than testing, and the second processing system being dedicated to device testing;

generating, on the first processing system, an altered test program by altering the test program developed at the first processing system, the altered test program being executable on the second processing system to test the device under test, the second processing system being programmed to run one or more test programs including the altered test program to test the device under test, the second processing system comprising one or more processors;

transmitting the altered test program from the first processing system to the second processing system;

receiving the altered test program from the first processing system at the second processing system for testing the device under test; and executing the altered test program on the second processing system to test the device under test, where testing by the second processing system is performed through logic that is programmable both to act as an interface to the device under test and to perform one or more test operations on the device under test, the logic being a third tier in the tiered processing system and at a lower tier than the second processing system;

wherein the first processing system comprises a translation engine to generate the altered test program to enable executing the altered test program on the second processing system.

15. The method of claim 14, wherein the first processing system has a first application programming interface (API) and the second processing system has a second API, the first API and the second API being different APIs, the first API and the second API having at least some duplicate functions.

16. The method of claim 15, wherein the test program comprises one or more calls to functions of the first API.

17. The method of claim 16, wherein generating the altered test program comprises identifying one or more corresponding functions of the second API that correspond to the one or more functions of the first API.

18. The method of claim 17, wherein generating the altered test program comprises replacing the one or more calls to functions of the first API with one or more calls to corresponding functions of the second API.

19. The method of claim 14, further comprising providing a development environment associated with the second processing system that allows the altered test program to be modified at the second processing system.

20. The method of claim 14, wherein the first processing system generates a user interface, the user interface for interacting with the second processing system through an API.

\* \* \* \* \*